(12) United States Patent
Shlyakhov

(10) Patent No.: US 10,432,974 B2
(45) Date of Patent: Oct. 1, 2019

(54) METHODS AND APPARATUS TO PERFORM FRACTIONAL-PIXEL INTERPOLATION FILTERING FOR MEDIA CODING

(71) Applicant: Intel Corporation, Santa Clara, CA (US)

(72) Inventor: Nikolay Mikhailovich Shlyakhov, Togliatti (RU)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 15/111,161

(22) PCT Filed: Feb. 13, 2014

(86) PCT No.: PCT/IB2014/000518
§ 371 (c)(1),
(2) Date: Jul. 12, 2016

(87) PCT Pub. No.: WO2015/121701
PCT Pub. Date: Aug. 20, 2015

(65) Prior Publication Data
US 2016/0337666 A1 Nov. 17, 2016

(51) Int. Cl.
*H04N 19/80* (2014.01)
*G06T 3/40* (2006.01)
(Continued)

(52) U.S. Cl.
CPC .......... *H04N 19/80* (2014.11); *G06T 3/4007* (2013.01); *H04N 19/117* (2014.11);
(Continued)

(58) Field of Classification Search
CPC ...................................................... H04N 19/80
See application file for complete search history.

(56) References Cited

U.S. PATENT DOCUMENTS 4,472,785 A * 9/1984 Kasuga .............. H03H 17/0685
327/113
7,379,501 B2 5/2008 Lainema
(Continued)

FOREIGN PATENT DOCUMENTS

CN 1615645 5/2005
JP 2003-163936 6/2003

OTHER PUBLICATIONS

Georgis et al., "Study of interpolation filters for motion estimation with application in H.264/AVC encoders," IEEE, 2011 (4 pages).
(Continued)

*Primary Examiner* — Rowina J Cattungal
(74) *Attorney, Agent, or Firm* — Hanley, Flight & Zimmerman, LLC

(57) ABSTRACT

Methods, apparatus, and articles of manufacture to perform fractional-pixel interpolation filtering for media coding are disclosed. A disclosed example method involves applying a finite impulse response (FIR) filter to samples of a source signal to generate an array of values. After applying the FIR filter, an infinite impulse response (IIR) filter is applied to the array of the values to generate fractional-pixel interpolated values. The fractional-pixel interpolated values may be stored in an encoded video data structure or may be output to a display interface.

25 Claims, 8 Drawing Sheets

(51) Int. Cl.

| | |
|---|---|
| *H04N 19/523* | (2014.01) |
| *H04N 19/59* | (2014.01) |
| *H04N 19/117* | (2014.01) |
| *H04N 19/182* | (2014.01) |
| *H04N 19/196* | (2014.01) |
| *H04N 19/587* | (2014.01) |

(52) U.S. Cl.
CPC ......... *H04N 19/182* (2014.11); *H04N 19/196* (2014.11); *H04N 19/523* (2014.11); *H04N 19/587* (2014.11); *H04N 19/59* (2014.11)

(56) References Cited

U.S. PATENT DOCUMENTS

| | | | |
|---|---|---|---|
| 8,265,151 | B1 | 9/2012 | Wang et al. |
| 8,498,338 | B1 | 7/2013 | Wang et al. |
| 2005/0196072 | A1* | 9/2005 | Zhong .................. G06T 3/4007 382/298 |
| 2007/0194955 | A1* | 8/2007 | Azizi .................. H03H 17/028 341/61 |
| 2008/0208941 | A1* | 8/2008 | Koyanagi ............. G06T 3/4007 708/313 |
| 2012/0134425 | A1 | 5/2012 | Kossentini et al. |
| 2013/0039428 | A1* | 2/2013 | Lakshman ............. H04N 19/61 375/240.16 |
| 2013/0177081 | A1* | 7/2013 | Chen ...................... H04N 19/80 375/240.16 |

OTHER PUBLICATIONS

Lakshman, et al., "Generalized Interpolation-Based Fractional Sample Motion Compensation," IEEE Transactions on Circuits and Systems for Video Technology, vol. 23, No. 3., Mar. 2013 (12 pages).
Charles M. Rader, "The Rise and Fall of Recursive Digital Filters," IEEE Signal Processing Magazine, Nov. 2006 (pp. 46-49).
Schafer, et al., "A Digital Signal Processing Approach to Interpolation," Proceedings of the IEEE, vol. 61, Jun. 1973 (11 pages).
Michael Unser, "Recursive filters for fast B-spline interpolation and compression of digital images," SPIE vol. 1232 Medical Imaging IV: Image Capture and Display, 1990 (11 pages).
Michael Unser, "Splines A Perfect Fit for Signal and Image Processing," IEEE Signal Processing Magazine, Nov. 1999 (17 pages).
Thevenaz, et al., "Interpolation Revisited," IEEE Transactions on Medical Imaging, vol. 19, No. 7, Jul. 2000 (20 pages).
Rachid Deriche, "Recursively Implementing The Gaussian and its Derivatives," Apr. 1993 (25 pages).
Young, et al., "Recursive implementation of the Gaussian filter," Signal Processing 44, 1995 (13 pages).
Ferrari, et al., "Interpolation Using a Fast Spline Transform (FST)," IEEE Transaction on Circuits and Systems—I: Fundamental Theory and Applications, vol. 46, No. 8, Aug. 1999 (16 pages).
Triggs et al., "Boundary Conditions for Young-van Vliet Recursive Filtering," IEEE Transactions on Signal Processing, vol. 54, No. 6, Jun. 2006 (3 pages).
Park et al., "Correction to Interpolation using a Fast Spline Transform (FST)," IEEE Transactions on Circuits and Systems Part 1: Fundamental Theory and Applications, vol. 47, No. 7, Jul. 2000 (1 page).
Lakshman, et al., "Generalized Interpolation for Motion Compensated Prediction," 18th IEEE International Conference on Image Processing, 2011 (4 pages).
International Searching Authority, "International Search Report and Written Opinion," issued in connection with International Patent Application No. PCT/IB2014/000518, dated Feb. 3, 2015 (17 pages).
Lakshman, et al., "Fractional-Sample Motion Compensation Using Generalized Interpolation," 28th Picture Coding Symposium, PCS2010, Dec. 8-10, 2010 (4 pages).
Malvar, et al., "Optimal FIR Pre- and Postfilters for Decimation and Interpolation of Random Signals," IEEE Transactions on Communications, vol. 36, No. 1, Jan. 1988 (8 pages).
Chan, D. S. K., et al., "Theory of Roundoff Noise in Cascade Realizations of Finite Impulse Response Digital Filters", The Bell System Technical Journal, vol. 52, No. 3, Mar. 1973 (18 pages).
Sung, et al., "Efficent Fir Filter Design Using Differential Coding of Filter Coefficients," IEEE, 1985 (4 pages).
Stranneby et al., "Digital Signal Processing and Applications," second edition, ISBN 0 7506 6344 8, Burlington, 2004, 370 pages.
State Intellectual Property Office of China, "Office Action," issued in connection with Chinese Patent Application No. 201480073110. 9, dated Jun. 16, 2017, 7 pages.
The State Intellectual Property Office of China, "Notice on Grant of Patent Right for Invention," issued in connection with Chinese patent application No. 201480073110.9, dated Dec. 6, 2017, 6 pages.

* cited by examiner

METHODS AND APPARATUS TO PERFORM FRACTIONAL-PIXEL INTERPOLATION FILTERING FOR MEDIA CODING

FIELD OF THE DISCLOSURE

The present disclosure relates generally to media coders and, more particularly, to methods, apparatus, and articles of manufacture to perform fractional-pixel interpolation filtering for media coding.

BACKGROUND

In general, a video or video program is formed using a plurality of sequential still-picture frames organized temporally to create a motion picture when presented sequentially at a particular speed. Video production, video delivery, and video presentation typically involve encoding and/or decoding video information including the still-picture frames (i.e., video frames). For example, video information may be encoded to enhance the visual quality of a video presentation and/or to compress the video information to use less storage space and/or to decrease delivery time to a viewer. Example video encoding standards include, for example, H.263, Moving Picture Expert Group ("MPEG") standards, H.264, VC-1, etc.

Videos can be generated using different frame rates (e.g., 7 frames/second, 15 frames/second, 30 frames/second, etc.) and different pixel resolutions. In any case, processing (e.g., encoding or decoding) video typically requires processing relatively large amounts of data. Processing such large amounts of information in a timely manner while maintaining high video quality and accuracy can require a considerable amount of processing power. In some cases, dedicated video systems are used to encode and/or decode video information. In other cases, general purpose or multi-purpose computers having general purpose processors and/or enhanced video processing capabilities (e.g., video processors) are used to encode and/or decode video information.

Some video encoding or decoding devices contain motion estimation and motion compensation parts designed to code and decode motion information with minimal or no losses in it. Some motion estimation and motion compensation parts of a video processing device comprise an upsampler to improve the quality of coded or decoded video when fewer bits are used for coding of motion information as specified in many video coding standards. Typically, an upsampler is a time consuming part of motion estimation or motion compensation processes.

DETAILED DESCRIPTION

Figure 1:
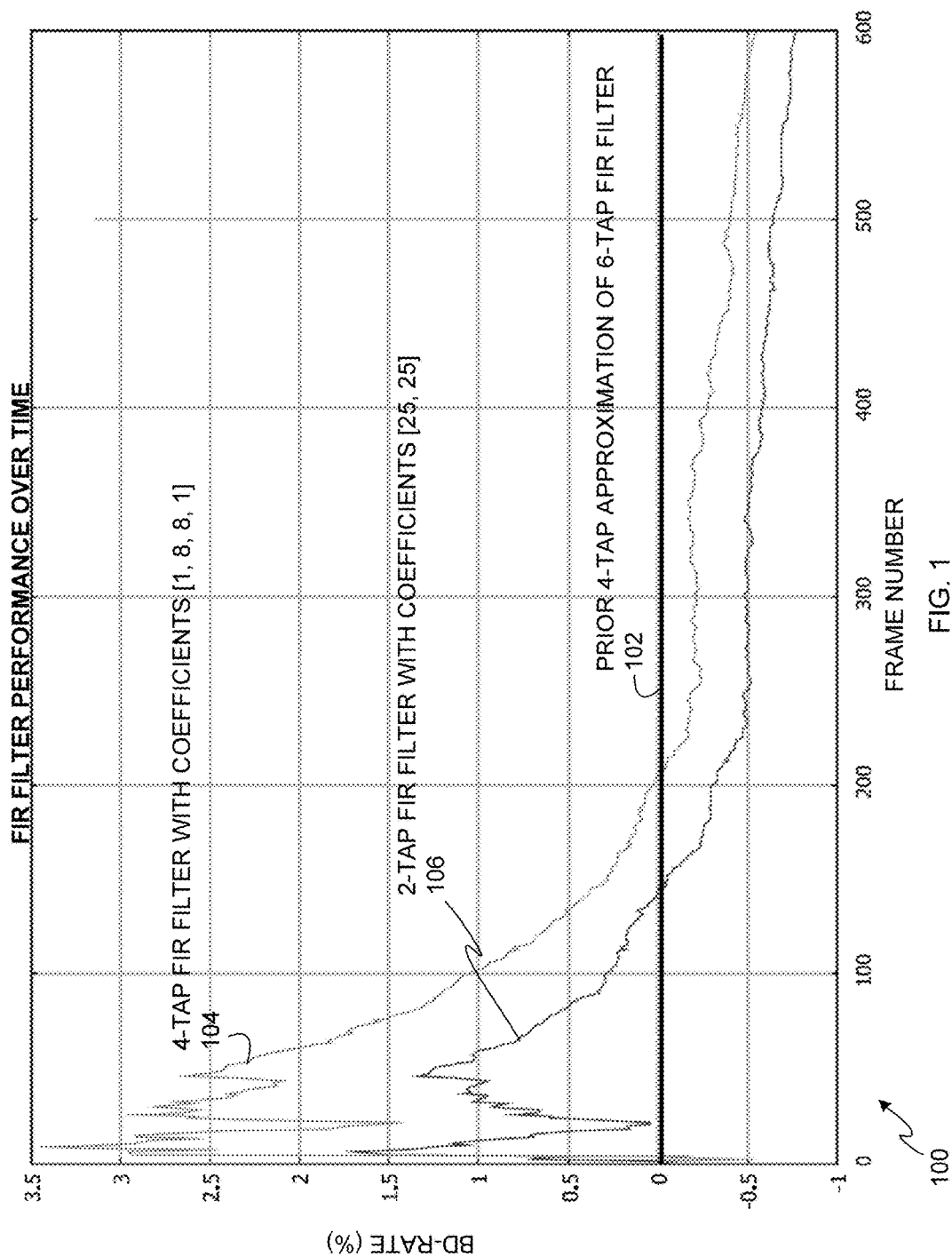
FIG. 1 is a graph showing example performance measures of example finite impulse response (FIR) filter followed by infinite impulse response (IIR) filter (FIR/IIR cascade) techniques disclosed herein relative to prior filter techniques.

Examples disclosed herein may be used to perform fractional-pixel interpolation filtering in media coding. For example, disclosed examples may be used to generate fractional-pixel interpolated values in connection with motion estimation and motion compensation information in video coding. Examples disclosed herein enable implementing an upsampler that uses less time during motion estimation or motion compensation processes while achieving negligible or low loss in the quality of coded or decoded video. Examples disclosed herein involve low-complexity fractional half-pixel interpolation filtering schemes that may be used to approximate a H.264/AVC half-pixel filter, thus, enabling fast motion estimation during video encoding operations. H.264/AVC (Advanced Video Coding) is a video coding standard of the International Telecommunication Union (ITU). Examples disclosed herein improve the precision of interpolation filtering over prior techniques that use an infinite impulse response (IIR) filter followed by a finite impulse response (FIR) filter (IIR/FIR cascade) using fixed-point arithmetic. For example, examples disclosed herein may be used to more accurately represent original video information in compressed formats.

In addition, because of the relatively high coding accuracies (e.g., the degree to which a compressed video resembles the original video) achievable with examples disclosed herein, such disclosed examples may also be used as self-consistent interpolation filters for motion compensation. An interpolation filter is used to re-create information (e.g., pixel data or fractional-pixel data) that is not explicitly found in coded video. For example, if video is originally sampled at a lower sampling rate, an interpolation filter may be used during an upsampling process to interpolate or estimate data that would have been present in the original video if the video were originally created using a higher sampling rate. Such interpolation may be used to, for example, upsample a 720×480-resolution (480i or 480p) video signal to a 1440×960-resolution video.

A self-consistent filter is a filter that is the same for motion estimation and motion compensation. Motion estimation and motion compensation are used in hybrid architectures that are compliant with numerous video codec standards. Motion estimation is performed on the encoder side only, and motion compensation is performed on the encoder side and the decoder side. If a decoder is compliant with a standard like H.264/AVC, then a standard filter is used for motion compensation. In some instances, other interpolation filters may be used for motion estimation. In prior techniques, less complex interpolation filters are used for motion estimation to decrease encoding time. However, less complex usually means less accurate, and such uses of less complex interpolation filters can often lead to problematic, low-quality results. Unlike prior techniques, examples filter techniques disclosed herein may be used to generate very accurate results relative to prior techniques. In addition, examples disclosed herein may be used to implement motion estimation and motion compensation parts of a codec in connection with any suitable codec standard in addition to or instead of the H.264/AVC standard. In some examples, examples disclosed herein may be used only for the motion estimation part of a codec because it is a very close approximation to an H.264/AVC interpolation filter without needing to fully implement a more operation-intensive H.264/AVC interpolation filter.

Examples disclosed herein include a 4-tap finite impulse response (FIR) filter followed by an infinite impulse response (IIR) filter technique and a 2-tap FIR filter followed by an IIR filter technique. Both types of techniques (e.g., example 4-tap FIR followed by an IIR filter techniques, and example 2-tap FIR filter followed by an IIR filter techniques) disclosed herein involve first applying an FIR filter on input data, and subsequently performing an IIR filtering process on the resulting output from the FIR filter. An FIR filter is a filter having an impulse response (e.g., an output based on a brief input signal called an impulse) that is of finite duration meaning that after an initial response or output of the FIR filter, the output eventually settles to zero over time (e.g., the output settles to zero within a finite amount of time). FIR filters are sometimes used in media coding applications to implement interpolation filters to upsample data of media signal sources. An IIR filter is a filter having an impulse response that continues to be non-zero over time (e.g., does not settle to zero within a finite amount of time). In examples disclosed herein, an FIR filter is applied first, and an IIR filter is applied after the FIR filter. Example FIR/IIR cascade filter techniques that apply an FIR filter first and an IIR filter second as disclosed herein eliminate or decrease the possible occurrence of artificial bit-depth increases in intermediate computations that occur in prior IIR/FIR cascade filter techniques. Examples disclosed herein can eliminate or decrease such artificial bit-depth increases in the intermediate computations while producing the same or better results than prior techniques and while using the same or less computational operations. Although examples are disclosed herein in connection with video coding (e.g., video compression/decompression) examples disclosed herein may be used in connection with any of numerous other types of media coding including, for example, still image processing, sound processing, and/or any other signal processing that have previously involved an IIR/FIR cascade.

Examples disclosed herein are implemented using fixed-point arithmetic. Example FIR filters disclosed herein are implemented as a finite weighted sum of signal samples with weights being integer numbers $f(0) \ldots f(M)$ and signal samples also being integer numbers. Example IIR filters disclosed herein are implemented using two recursive passes based on, for example, Functions 15-22 described below. In examples disclosed herein, IIR filters are implemented with a rational pole (or multiplier) $p=(-K)/L$, where K and L are signed integer numbers and all computations are performed in fixed-point arithmetic. In some examples, FIR filters disclosed herein are applied using integer arithmetic, and the sum of the coefficients of the FIR filter is a multiple of an integer denominator of a rational number equal to $1/(1-p)$ (e.g., the integer denominator of a rational number $1/(1-p) = 1/(1-(-K/L)) = 1/((K+L)/L) = L/(K+L)$). In other words, the sum of the coefficients of the FIR filter is a multiple of $(K+L)$. Example FIR filters disclosed herein have integer sums of their integer coefficients. In examples disclosed herein, the integer coefficients of an FIR filter are multiples of an integer number $(K+L)$ of the pole (p) of the IIR filter which is applied after the FIR filter. An example integer sum of the inter coefficients of an FIR filter may be written as $f(0)+f(1)+\ldots+f(M)=(K+L)*A1*A2* \ldots *Ai$, where (*) is an integer multiplication and all numbers $A1 \ldots Ai$ are integers. This integer sum of integer coefficients property allows decreasing round-off errors of interpolated pixels during computations.

Example 4 tap FIR filter followed by IIR filter techniques disclosed herein involve (1) using a 4-tap FIR filter with coefficient values of [1, 8, 8, 1] that are all powers of two, which allows implementing the FIR filter using fewer bit-shift operations and addition operations without using multiplication operations, (2) using two 4-term initializations to prepare data for performing an IIR filtering process, and (3) applying an IIR filter with a pole value of −½. Example 2-tap FIR filter followed by IIR filtering techniques disclosed herein involve (1) using a 2-tap FIR filter with coefficient values of [25, 25], (2) using two 2-term initializations to prepare data for performing an IIR filtering process, and (3) applying an IIR filter with a pole value of −¼. In the illustrated examples, pole is a multiplier used in recursive Functions 15-22 described below. For example, in Functions 15 and 16, the pole (e.g., the multiplier) is −½ and is implemented as a subtraction and bitwise right shift by 1 bit (e.g., $c[j]-=(c[j-1]>>1)$ of Function 15). In example Functions 19 and 20, the pole (e.g., the multiplier) is −¼ and is implemented as a bitwise right shift by 2 bits (e.g., $c[j]-=(c[j-1]>>2)$ of Function 19). Although examples are disclosed herein in connection with 4-tap and 2-tap FIR filters, examples disclosed herein may be used in connection with FIR filters having any other number of taps and with any suitable IIR filter implemented using fixed-point arithmetic.

Both types of filtering techniques disclosed herein (e.g., the example 4-tap FIR filter followed by an IIR filter techniques, and the example 2-tap FIR filter followed by an IIR filter techniques) use fewer and/or faster operations per pixel than prior H.264/AVC 6-tap interpolation filters given that one multiplication operation has a conventional time measure of 3, one addition operation has a measure of 1, and a bitwise shift operation has a measure of 1. Thus, examples disclosed herein provide good results after motion estimation, thereby, providing faster processing during a video encoding or decoding process. In particular, motion estimation of video encoding processes may be implemented using example filtering techniques disclosed herein to generate relatively better results than those achieved using prior FIR filters such as a 4-tap FIR filter with coefficients [−1, 5, 5, −1]. In some examples, using the example 4-tap FIR filter type of technique disclosed herein provides an average achievable gain over the prior [−1, 5, 5, −1] coefficient 4-tap FIR filter of ~0.15% on average in terms of BD-rate. In some examples, using the example 2-tap FIR filter type of technique disclosed herein provides an average achievable gain over the prior [−1, 5, 5, −1] coefficient 4-tap FIR filter of ~0.05% on average in terms of BD-rate. (BD-rate is known as the Bjontegaard Distortion-rate (BD-rate) measurement and is a well-known metric used to measure the bit rate performance in media coding.) These achievable gains are based on tested video sequences of low resolution, reaching as much as 0.63% compression gain. In such tested video sequences, filtering was performed on blocks of size 4×4, 8×8, and 16×16 with most small blocks being handled by the AVC encoder so that relatively better performance could be achieved on larger interpolation regions because of the larger regions having less influence from boundaries (e.g., boundaries between macroblocks). While a prior 6-tap half-pixel filter may be implemented using 2 MUL (multiply) and 5 ADD (addition or subtraction) operations per pixel (e.g., 7 operations with a conventional time measure of 11), and a prior 4-tap FIR half-pixel filter uses 1 MUL and 3 ADD operations per pixel (e.g., 4 operations with a conventional time measure of 6), the example 4-tap FIR filter with an IIR cascade with a pole value of −½ technique disclosed herein uses 3 SH (bit-shift) and 5 ADD operations per pixel (e.g., 8 operations with a conventional time measure of 8), and the example 2-tap FIR filter with an IIR cascade with a pole value of −½ technique disclosed herein uses 1 MUL, 2 SH, and 3 ADD operations per pixel (i.e., 6 operations with a conventional time measure of 8). Thus, examples disclosed herein provide the same or better performance, while requiring fewer and/or faster operations per pixel than prior 6-tap H.264/AVC filters.

FIG. 1 shows a graph 100 of example cumulative BD-rate (in percentage) that illustrates a comparison showing how the example performances of the example 4-tap FIR filter with coefficients [1, 8, 8, 1] followed by IIR filtering with a pole value of −½ technique disclosed herein and the example 2-tap FIR filter with coefficients [25, 25] followed by IIR filtering with a pole value of −¼ technique disclosed herein are better than the performance of a prior 4-tap [−1, 5, 5, −1] approximation of a 6-tap H.264/AVC FIR filter based on the same number of frames of the same video sequence. In the illustrated example of FIG. 1, the zero-line plot 102 represents the performance of a prior 4-tap approximation of a 6-tap FIR filter. A 4-tap FIR filter performance line plot 104 represents the performance of the example 4-tap FIR filter with coefficients [1, 8, 8, 1] followed by an IIR filtering with a pole value of −½ technique disclosed herein. A 2-tap FIR filter performance line plot 106 represents the performance of the example 2-tap FIR filter with coefficients [25, 25] followed by an IIR filtering with a pole value of −¼ technique disclosed herein. In the example graph 100 of FIG. 1, lower values are better. As such, both types of filtering techniques disclosed herein (the example 4-tap FIR filter followed by an IIR filter technique represented by the 4-tap FIR filter performance line plot 104, and the example 2-tap FIR filter followed by an IIR filter technique represented by the 2-tap FIR filter performance line plot 106) quickly surpass the performance of the prior 4-tap approximation of a 6-tap FIR filter.

In addition, because of the relatively improved performance of examples disclosed herein over prior solutions, examples disclosed herein may also be used to implement self-consistent half-pixel interpolation filters for motion compensation which are not covered by existing standards for video coding. For example, the filtering techniques disclosed herein may be used to perform pixel interpolation of short signals down to a length of four (e.g., interpolate out to four pixels).

Example methods, apparatus, and computer readable storage media comprising instructions are disclosed herein to first apply a FIR filter to samples of a source signal to generate an array of values, and after applying the FIR filter, to subsequently apply an IIR filter to each value of the array to generate fractional-pixel interpolated values. Some such disclosed examples may be used in video encoding processes and/or video decoding processes. For example, the fractional-pixel interpolated values may be stored in an encoded video data structure (e.g., a file to store compressed video) during a video encoding process and/or used as a prediction signal or prediction data in a prediction process of a hybrid video encoder. In some examples, prediction data from a previous frame is used to encode a future frame. Alternatively, the fractional-pixel interpolated values may be output to a display interface for displaying decoded video during a video decoding process.

In some examples, the FIR filter is a 4-tap FIR filter with coefficient values [1, 8, 8, 1] followed by an IIR filtering with a pole value of −½. Alternatively, in some examples, the FIR filter is a 2-tap FIR filter with coefficient values [25, 25] followed by an IIR filtering with a pole value of −¼. In some examples, the fractional-pixel interpolated values are half-pixel interpolated values. In some examples, applying the FIR filter and the IIR filter involves applying the FIR filter and the IIR filter in a H.264/AVC encoder using a half-pixel filter to perform motion estimation and/or upsampling of a video.

In some disclosed examples, the IIR filter is implemented with a rational pole (p). In such examples, (p) is equal to (−K)/L, and K and L being signed integer numbers. In some such examples, the FIR filter is applied using integer arithmetic, and the sum of the coefficients of the FIR filter is a multiple of (K+L). In some examples, applying the FIR filter to the samples of the source signal involves applying the FIR filter with coefficient values that are powers of two.

In some disclosed examples, applying the IIR filter involves first applying a causal IIR filter to each value of the array to generate a second array of second values, and after applying the causal IIR filter, subsequently applying an anti-causal IIR filter to the second array of second values to generate the fractional-pixel interpolated values. In some such disclosed examples, the IIR filter is initialized by applying a weighted sum of four of the source signal samples with weights [34, 51, 13, −2] to boundary conditions for the causal IIR filter pass with a pole value of −½, and applying a weighted sum of four of the source signal samples with weights [36, 52, 12, −1] to boundary conditions for the anti-causal IIR filter pass with a pole value of −½. Alternatively in some such disclosed examples, the IIR filter is initialized by applying a weighted sum of two of the source signal samples with weights [19, 20] to boundary conditions for the causal IIR filter pass with a pole value of −¼, and applying a weighted sum of two of the source signal samples with weights [20, 19] to boundary conditions for the anti-causal IIR filter pass with a pole value of −¼. Alternatively in some such disclosed examples, the IIR filter is initialized by applying a weighted sum of three of the source signal samples with weights [11, 30, −1] to boundary conditions for the causal IIR filter pass with a pole value of −¼, and applying a weighted sum of three of the source signal samples with weights [−1, 30, 11] to boundary conditions for the anti-causal IIR filter pass with a pole value of −¼.

Alternatively, in some disclosed examples, applying the IIR filter involves first applying an anti-causal IIR filter to each value of the array to generate a second array of second values, and after applying the anti-causal IIR filter, subsequently applying the causal IIR filter to the second array of second values to generate the fractional-pixel interpolated values. In some such disclosed examples, the IIR filter is initialized by applying a weighted sum of four of the source signal samples with weights [44, 58, 11, −1] to the boundary conditions for the anti-causal IIR filter pass with a pole value of −½, and applying a weighted sum of four of the source signal samples with weights [−2, 13, 51, 34] to the boundary conditions for the causal IIR filter pass with a pole value of −½. Alternatively in some such disclosed examples, the IIR filter is initialized by applying a weighted sum of two of the source signal samples with weights [20, 22] to boundary conditions for the anti-causal IIR filter pass with a pole value of −¼, and applying a weighted sum of two of the source signal samples with weights [21, 19] to boundary conditions for the causal IIR filter pass with a pole value of −¼. Alternatively in some such disclosed examples, the IIR filter is initialized by applying a weighted sum of three of the source signal samples with weights [11, 30, −1] to boundary conditions for the anti-causal IIR filter pass with a pole value of −¼, and applying a weighted sum of three of the source signal samples with weights [−1, 30, 11] to boundary conditions for the causal IIR filter pass with a pole value of −¼.

Figure 2:
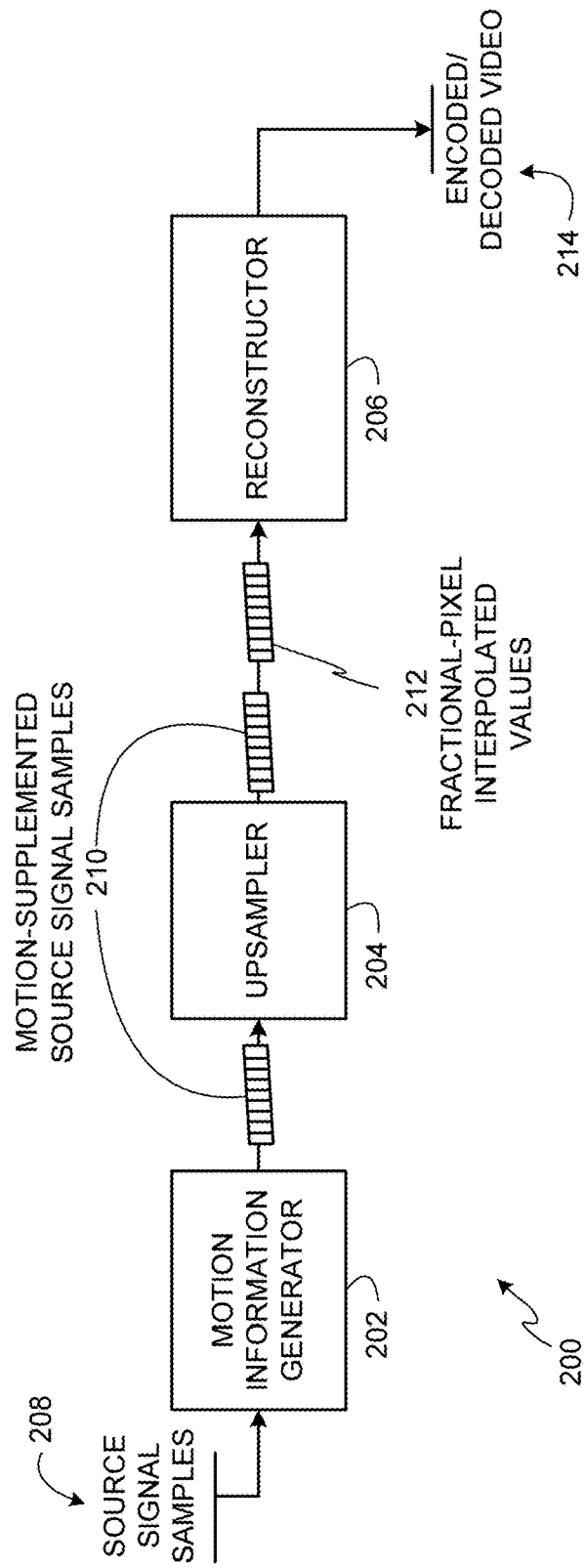
FIG. 2 depicts an example apparatus that may be used in a video encoder and/or video decoder.

FIG. 2 depicts an example apparatus 200 constructed in accordance with the teachings of this disclosure. The example apparatus 200 of FIG. 2 may be used in, for example, a video encoder and/or video decoder. The example apparatus 200 may be used to perform fractional-pixel interpolation to upsample a source signal in connection with motion estimation and motion compensation information. The example apparatus 200 of FIG. 2 includes a motion information generator 202, an upsampler 204, and a reconstructor 206. The motion information generator 202 of the illustrated example processes source signal samples 208 to generate motion information based on a video coding standard. The source signal samples 208 of the illustrated example are pixels that form one or more frames of a video. In the illustrated example, the motion information generator 202 generates motion estimation and motion compensation information based on an H.264/AVC video coding standard. However, the motion information generator 202 may be implemented in accordance with any other suitable video coding standard.

In the illustrated example, the motion information generator 202 provides generated motion information to the upsampler 204 as motion-supplemented source signal samples 210 representative of pixel information (e.g., the source signal samples 208) and motion vector components. The upsampler 204 of the illustrated example performs pixel interpolation on the motion-supplemented source signal samples 210 as described in greater detail below in connection with FIG. 3. In the illustrated example, the upsampler 204 performs the pixel interpolation on the motion-supplemented source signal samples 210 to create additional pixels to increase the size or resolution of output video data. When the upsampler 204 of the illustrated example interpolates pixels, the upsampler 204 also applies the motion estimation or motion compensation information from the motion information generator 202 to the interpolated pixels so that the motion estimation or compensation is uniformly applied across original pixels represented by the source signal samples 208 and the interpolated pixels generated by the upsampler 204.

In the illustrated example, the upsampler 204 provides the motion-supplemented source signal samples 210 received from the motion information generator 202 and fractional-pixel interpolated values 212 to the reconstructor 206. In the illustrated example, the fractional-pixel interpolated values 212 are upsampled values based on the source signal samples 208 and the motion-supplemented source signal samples 210. The fractional-pixel interpolated values 212 of the illustrated example are half-pixel interpolated values. However, any other pixel-size interpolation may be performed. In the illustrated example, the reconstructor 206 performs pixel-level operations on the motion-supplemented source signal samples 210 and the fractional-pixel interpo-lated values 212. In some examples, the reconstructor 206 performs inter-frame and/or intra-frame operations to generate encoded and/or decoded video data 214 based on a video coding standard (e.g., the H.264/AVC standard). For example, if the apparatus 200 is used to encode video data, encoded video data 214 (e.g., the motion-supplemented signal samples 210 and the fractional-pixel interpolated values 212) is stored in a data structure (e.g., a file storing a video file) or used as a predictor with which residual data is computed and coded in a bitstream. Alternatively, if the apparatus 200 is used to decode video data, decoded video data 214 (e.g., the motion-supplemented signal samples 210 and the fractional-pixel interpolated values 212) is provided to a display interface for displaying a decoded video or used as prediction data to which a decoded residual is added and the sum (e.g., the combined motion-supplemented signal samples 210 and fractional-pixel interpolated values 212) is processed and eventually displayed.

Figure 3:
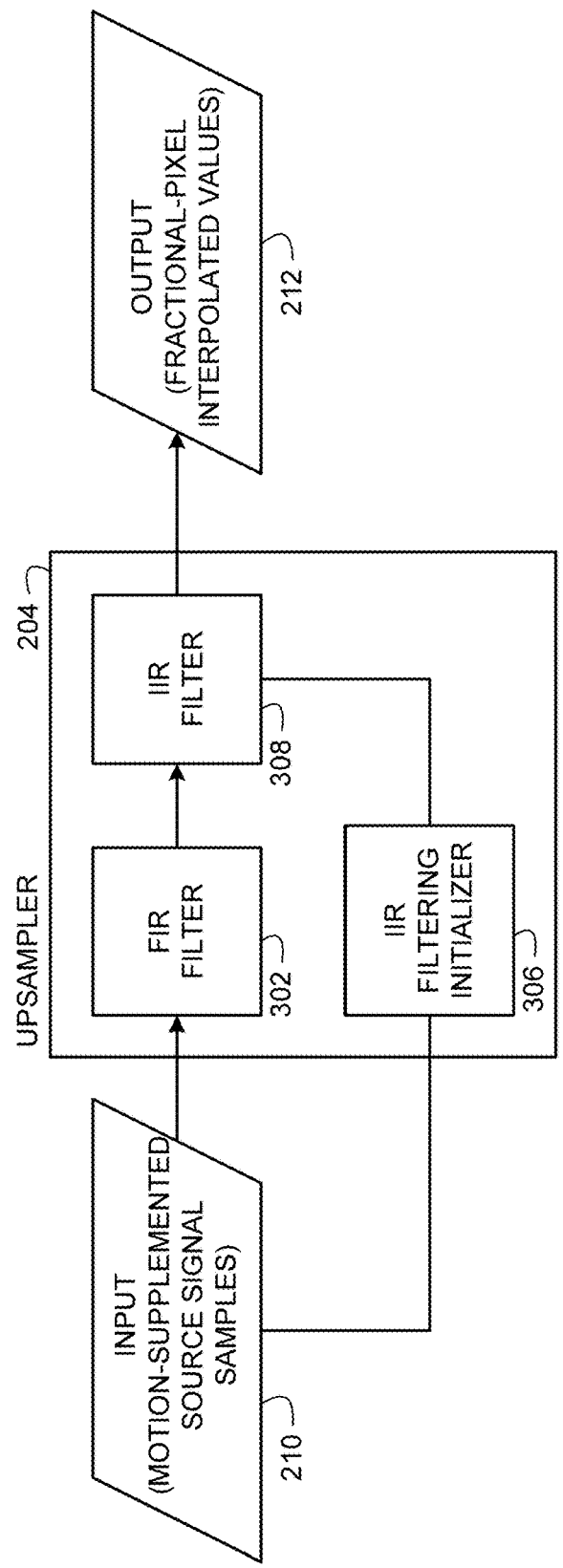
FIG. 3 illustrates an example upsampler of the example apparatus of FIG. 2.

FIG. 3 illustrates an example implementation of the example upsampler 204 of the example apparatus 200 of FIG. 2. The upsampler 204 of the illustrated example receives the motion-supplemented source signal samples 210 (e.g., the source signal samples 208 and motion vector components), and performs FIR filtering followed by IIR filtering on the motion-supplemented source signal samples 210 to generate the fractional-pixel interpolated values 212. The upsampler 204 of the illustrated example may be configured to perform example 4-tap FIR filter followed by IIR filtering techniques disclosed herein that involve (1) using a 4-tap FIR filter with coefficient values of [1, 8, 8, 1] that are all powers of two, (2) using two 4-term initializations to prepare data for performing an IIR filtering process, and (3) applying an IIR filter with a pole value of −½. Additionally or alternatively, the upsampler 204 of the illustrated example may be configured to perform example 2-tap FIR filtering followed by IIR filtering techniques disclosed herein that involve (1) using a 2-tap FIR filter with coefficient values of [25, 25], (2) using two 2-term initializations to prepare data for performing an IIR filtering process, and (3) applying an IIR filter with a pole value of −¼.

In the illustrated example, the upsampler 204 is provided with a FIR filter 302, an IIR filtering initializer 306, and an IIR filter 308. In the illustrated example, the motion-supplemented source signal samples 210 include N+3 samples (e.g., pixels) of a source signal pS[−1 . . . N+2] (e.g., the source signal samples 208 of FIG. 2), wherein (N) is the number of desired output samples with ½-pixel (e.g., ½-pel) accuracy. The FIR filter 302 of the illustrated example is configured to apply an FIR filter to the motion-supplemented source signal samples 210 to generate a set or array of values c[1 . . . N].

For the example 4-tap FIR filter followed by IIR filtering technique disclosed herein, the FIR filter 302 is implemented to generate the (N) values of the array of values c[1 . . . N] by applying a 4-tap filter with coefficient values of [1, 8, 8, 1] using Function 1 below.

$$\text{for}(j=0;j<N;j{+}{+})c[j{+}1]{=}(pS[j{-}1]{+}pS[j{+}2]){+}((pS[j]{+}pS[j{+}1]){<}{<}3). \qquad \text{Function 1}$$

For the example 2-tap FIR filter followed by IIR filtering technique disclosed herein, the FIR filter 302 is implemented to generate the (N) values of the array of values c[1 . . . N] by applying a 2-tap filter with coefficient values [25, 25] using Function 2 below.

$$\text{for}(j=0;j<N;j{+}{+})c[j{+}1]{=}(pS[j]{+}pS[j{+}1])*25. \qquad \text{Function 2}$$

After generating the array of values c[1 . . . N] using the FIR filter 302 using either the 4-tap FIR filter techniques using Function 1 above or the 2-tap FIR filter techniques using Function 2 above, the IIR filtering initializer 306 of the illustrated example performs an initialization in preparation for applying a causal IIR filter and an anti-causal IIR filter. In the illustrated example, the IIR filtering initializer 306 performs the initialization to create boundary conditions. That is, because the response of an IIR filter is of infinite duration (e.g., the response or output of an IIR filter never settles to zero), the IIR filtering initializer 306 creates boundary conditions so that a meaningful output of the IIR filter 308 of the illustrated example can be obtained for a corresponding finite duration (e.g., the boundary condition). The example IIR filtering initialization techniques disclosed herein are configured to achieve highly accurate fractional-pixel interpolated values 212 for high-quality media coding while requiring relatively few mathematical and processing operations to generate the fractional-pixel interpolated values 212.

Figure 8:
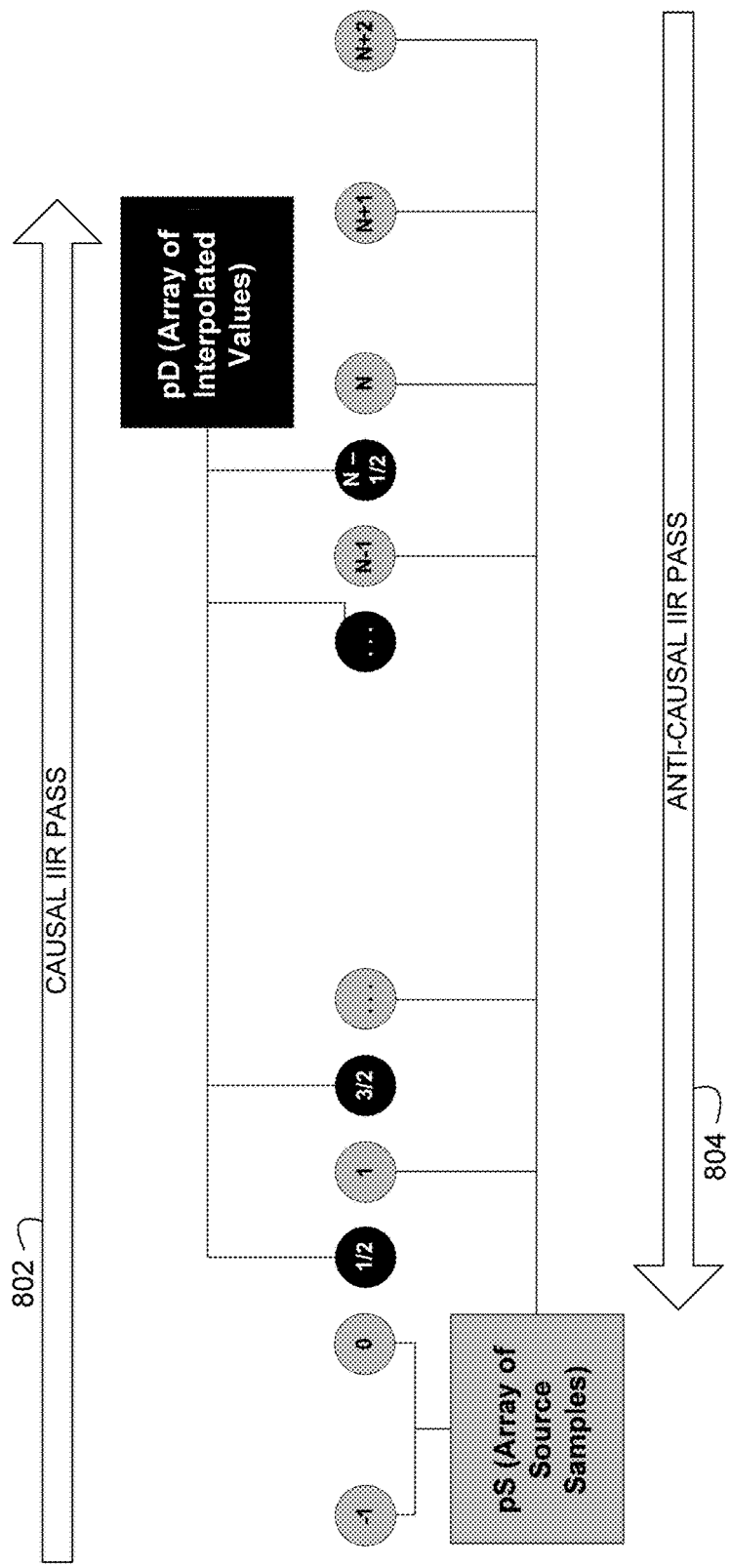
FIG. 8 illustrates an example of how causal IIR and anti-causal IIR filtering is performed on samples.

In the illustrated examples, the initialization performed by the IIR filtering initializer 306 is not dependent on source length. Also in the illustrated examples, the IIR filtering initializer 306 may be configured to perform initializations for the example 4-tap FIR filter followed by IIR filtering techniques disclosed herein and/or for the 2-tap FIR filter followed by IIR filtering techniques disclosed herein. For both the 4-tap FIR filter followed by IIR filtering techniques and the 2-tap FIR filter followed by IIR filtering techniques, IIR filtering can be performed by first applying a causal IIR filter followed by applying an anti-causal IIR filter. Alternatively, the IIR filtering can be performed by first applying an anti-causal IIR filter followed by applying a causal IIR filter. The order of the causal and anti-causal IIR filtering can be adapted to suit the needs of different implementations. FIG. 8 illustrates an example of how causal IIR and anti-causal IIR filtering is performed on samples. A causal IIR filter is typically applied from left to right (e.g., indices start from the side having the fewer number of auxiliary samples) on a set of input values or samples (e.g., the array of values c[1 . . . N]) as indicated by arrow 802 in FIG. 8, and an anti-causal IIR filter is typically applied from right to left (e.g., indices start from the side having more auxiliary samples) on a set of input values or samples (e.g., the array of values c[1 . . . N]) as indicated by arrow 804 in FIG. 8. However, the direction in which causal and anti-causal IIR filters are applied may be reversed to suit the needs of different implementations. The output of the IIR filtering initializer 306 of the illustrated example is a set or array of values c[0], c[N+1].

For the example 4-tap FIR filter followed by IIR filtering techniques disclosed herein, the boundary condition initialization performed by the IIR filtering initializer 306 is based on Functions 3 and 4 below when a causal IIR filter is applied before an anti-causal IIR filter is applied. That is, when applying a causal IIR filter first and an anti-causal IIR filter second, the IIR filtering initializer 306 uses example Function 3 below to initialize boundary conditions for the causal IIR filter, and uses example Function 4 below to initialize boundary conditions for the anti-causal IIR filter.

$$c[0]=(34*pS[-1]+51*pS[0]+13*pS[1]-2*pS[2])\!>\!\!>\!3 \quad \text{Function 3}$$

$$c[N+1]=(36*pS[N-1]+52*pS[N]+12*pS[N+1]-1*pS[N+2])\!>\!\!>\!3 \quad \text{Function 4}$$

Alternatively in connection with the example 4-tap FIR filter followed by IIR filtering techniques disclosed herein, when applying an anti-causal IIR filter first and subsequently applying a causal IIR filter, the IIR filtering initializer 306 initializes boundary conditions based on Functions 5 and 6 below. That is, when applying the anti-causal IIR filter first and the causal IIR filter second, the example IIR filtering initializer 306 uses example Function 5 below to initialize boundary conditions for the causal IIR filter, and uses example Function 6 below to initialize boundary conditions for the anti-causal IIR filter.

$$c[0]=(44*pS[-1]+58*pS[0]+11*pS[1]-1*pS[2])\!>\!\!>\!3 \quad \text{Function 5}$$

$$c[N+1]=(-2*pS[N-1]+13*pS[N]+51*pS[N+1]-34*pS[N+2])\!>\!\!>\!3 \quad \text{Function 6}$$

For the example 2-tap FIR filter followed by IIR filtering techniques disclosed herein, the IIR filtering initializer 306 may perform boundary condition initializations for reflecting boundary conditions and/or for non-reflecting boundary conditions. In the illustrated examples disclosed herein, a reflecting boundary condition is one in which the impulse response (e.g., the output) of the IIR filter 308 is reflected at the boundary of the impulse response defined by the boundary condition. In the illustrated examples disclosed herein, a non-reflecting boundary condition is one that allows the impulse response (e.g., the output) of the IIR filter 308 to exit (e.g., without reflection) the boundary of the impulse response defined by the boundary condition.

For the example 2-tap FIR filter followed by IIR filtering techniques disclosed herein, the IIR filtering initializer 306 may be configured to initialize reflecting boundary conditions based on Functions 7 and 8 below when a causal IIR filter is applied before an anti-causal IIR filter. That is, when applying a causal IIR filter first and an anti-causal IIR filter second, the example IIR filtering initializer 306 uses example Function 7 below to initialize reflecting boundary conditions for the causal IIR filter, and uses example Function 8 below to initialize reflecting boundary conditions for the anti-causal IIR filter.

$$c[0]=19*pS[-1]+20*pS[0] \quad \text{Function 7}$$

$$c[N+1]=20*pS[N+1]+19*pS[N+2] \quad \text{Function 8}$$

To generate non-reflecting boundary conditions for the example 2-tap FIR filter followed by IIR filtering techniques disclosed herein when a causal IIR filter is applied before an anti-causal IIR filter, the IIR filtering initializer 306 may be configured to initialize the non-reflecting boundary conditions based on Functions 9 and 10 below. That is, when applying a causal IIR filter first and an anti-causal IIR filter second, the example IIR filtering initializer 306 uses example Function 9 below to initialize non-reflecting boundary conditions for the causal IIR filter, and uses example Function 10 below to initialize non-reflecting boundary conditions for the anti-causal IIR filter.

$$c[0]=11*pS[-1]+30*pS[0]-pS[1] \quad \text{Function 9}$$

$$c[N+1]=-pS[N]+30*pS[N+1]+11*pS[N+2] \quad \text{Function 10}$$

Alternatively, when applying an anti-causal IIR filter first and subsequently applying a causal IIR filter in connection with the example 2-tap FIR filter followed by IIR filtering techniques disclosed herein, the IIR filtering initializer 306 initializes reflecting boundary conditions based on Functions 11 and 12 below. That is, when applying an anti-causal IIR filter first and a causal IIR filter second, the example IIR filtering initializer 306 uses example Function 11 below to initialize reflecting boundary conditions for the causal IIR filter, and uses example Function 12 below to initialize reflecting boundary conditions for the anti-causal IIR filter.

$$c[0]=20*pS[-1]+22*pS[0] \quad \text{Function 11}$$

$$c[N+1]=21*pS[N+1]+19*pS[N+2] \quad \text{Function 12}$$

To generate non-reflecting boundary conditions for the example 2-tap FIR filter followed by IIR filtering technique disclosed herein when a causal IIR filter is applied after an anti-causal IIR filter, the IIR filtering initializer 306 may be configured to initialize the non-reflecting boundary conditions based on Functions 13 and 14 below. That is, when applying an anti-causal IIR filter first and a causal IIR filter second, the example IIR filtering initializer 306 uses example Function 13 below to initialize non-reflecting boundary conditions for the causal IIR filter, and uses example Function 14 below to initialize non-reflecting boundary conditions for the anti-causal IIR filter.

$$c[0]=11*pS[-1]+30*pS[0]-pS[1] \quad \text{Function 13}$$

$$c[N+1]=-pS[N]+30*pS[N+1]+11*pS[N+2] \quad \text{Function 14}$$

In some examples, the IIR filtering initializer 306 may use weighting techniques to initialize the boundary conditions for the 4-tap FIR filter followed by an IIR filter and/or for the 2-tap FIR filter followed by an IIR filter. For example, the IIR filtering initializer 306 may apply different weighted sums to boundary conditions as described below by multiplying the weighted sums by the boundary conditions. When a causal IIR filter is applied first and an anti-causal IIR filter is applied second, the IIR filtering initializer 306 may apply a weighted sum of four source signal samples with weights [34, 51, 13, −2] to the boundary conditions for the causal IIR filter with a pole value of −½, and apply a weighted sum of four source signal samples with weights [36, 52, 12, −1] to the boundary conditions for the anti-causal IIR filter with a pole value of −½. Alternatively when a causal IIR filter is applied first and an anti-causal IIR filter is applied second, the IIR filtering initializer 306 may apply a weighted sum of two source signal samples with weights [19, 20] to the boundary conditions for the causal IIR filter with a pole value of −¼, and apply a weighted sum of two source signal samples with weights [20, 19] to the boundary conditions for the anti-causal IIR filter with a pole value of −¼. Alternatively when a causal IIR filter is applied first and an anti-causal IIR filter is applied second, the IIR filtering initializer 306 may apply a weighted sum of three source signal samples with weights [11, 30, −1] to the boundary conditions for a causal IIR filter with a pole value of −¼, and apply a weighted sum of three source signal samples with weights [−1, 30, 11] to the boundary conditions for the anti-causal IIR filter with a pole value of −¼.

When an anti-causal IIR filter is applied first and a causal IIR filter is applied second, the IIR filtering initializer 306 may apply a weighted sum of four source signal samples with weights [44, 58, 11, −1] to the boundary conditions for the anti-causal IIR filter with a pole value of −½, and apply a weighted sum of four source signal samples with weights [−2, 13, 51, 34] to the boundary conditions for the causal IIR filter with a pole value of −½. Alternatively when an anti-causal IIR filter is applied first and a causal IIR filter is applied second, the IIR filtering initializer 306 may apply a weighted sum of two source signal samples with weights [20, 22] to the boundary conditions for the anti-causal IIR filter with a pole value of −¼, and apply a weighted sum of two source signal samples with weights [21, 19] to the boundary conditions for the causal IIR filter with a pole value of −¼. Alternatively when an anti-causal IIR filter is applied first and a causal IIR filter is applied second, the IIR filtering initializer 306 may apply a weighted sum of three source signal samples with weights [11, 30, −1] to the boundary conditions for the anti-causal IIR filter with a pole value of −¼, and apply a weighted sum of three source signal samples with weights [−1, 30, 11] to the boundary conditions for the causal IIR filter with a pole value of −¼.

The output of the IIR filtering initializer 306 of the illustrated example is a set or array of values c[0], c[N+1], which the IIR filtering initializer 306 provides to the IIR filter 308. As described above, for both of the 4-tap FIR filter followed by IIR filtering techniques and the 2-tap FIR filter followed by IIR filtering techniques, the ordering in which causal and anti-causal IIR filters are applied by the IIR filter 308 may be changed to suit the particular needs of different implementations. When a causal IIR filter is applied first and an anti-causal IIR filter is applied second, the IIR filter 308 uses Function 15 below to apply the causal IIR filter with a pole value of −½ for the 4-tap FIR filter techniques followed by using Function 16 below to apply the anti-causal IIR filter.

```
Function 15
    for(j=1; j < N+2; j++) c[j] -= (c[j-1]>>1);
Function 16
    for(j=N; j > 0; j--)
    {
    c[j] -= (c[j+1]>>1);
    pD[j-1]=c[j] >> 3;
    }
```

In the illustrated example, the input to Function 15 is the array of values c[0 . . . N+1] generated by the IIR filtering initializer 306 and the FIR filter 302, and the output of Function 15 is a set or array of values c[1 . . . N+1]. As such, the input to Function 16 is the array of values c[1 . . . N+1] generated by Function 15.

When an anti-causal IIR filter is applied first and a causal IIR filter is applied second, the IIR filter 308 uses Function 17 below to apply the anti-causal IIR filter with a pole value of −½ for the 4-tap FIR filter techniques followed by using Function 18 below to apply the causal IIR filter.

```
Function 17
    for(j=N; j >= 0; j--) c[j] -= (c[j+1]>>1);
Function 18
    for(j=1; j <= N; j++)
    {
    c[j] -= (c[j-1]>>1);
    pD[j-1]=c[j] >> 3;
    }
```

In the illustrated example, the input to Function 17 is the array of values c[0 . . . N+1] generated by the IIR filtering initializer 306 and the FIR filter 302, and the output of Function 17 is a set or array of values c[0 . . . N]. As such, the input to Function 18 is the array of values c[0 . . . N] generated by Function 17.

When a causal IIR filter is applied first and an anti-causal IIR filter is applied second, the IIR filter 308 uses Function 19 below to apply the causal IIR filter with a pole value of −¼ for the 2-tap FIR filter techniques followed by using Function 20 below to apply the anti-causal IIR filter.

```
Function 19
    for(j=1; j < N+2; j++) c[j] -= (c[j-1]>>2);
Function 20
    for(j=N; j > 0; j--)
    {
```

```
c[j] -= (c[j+1]>>2);
pD[j-1]=c[j] >> 5;
}
```

In the illustrated example, the input to Function 19 is the array of values c[0 . . . N+1] generated by the IIR filtering initializer 306 and the FIR filter 302, and the output of Function 19 is a set or array of values c[1 . . . N+1]. As such, the input to Function 20 is the array of values c[1 . . . N+1] generated by Function 19.

When an anti-causal IIR filter is applied first and a causal IIR filter is applied second, the IIR filter 308 uses Function 21 below to apply the anti-causal IIR filter with a pole value of −¼ for the 2-tap FIR filter techniques followed by using Function 22 below to apply the causal IIR filter.

```
Function 21
    for(j=N; j >= 0; j--) c[j] -= (c[j+1]>>2);
Function 22
    for(j=1; j <= N; j++)
    {
    c[j] -= (c[j-1]>>2);
    pD[j-1]=c[j] >> 5;
    }
```

In the illustrated example, the input to Function 21 is the array of values c[0 . . . N+1] generated by the IIR filtering initializer 306 and the FIR filter 302, and the output of Function 21 is a set or array of values c[0 . . . N]. As such, the input to Function 22 is the array of values c[0 . . . N] generated by Function 21.

The output (pD[0 . . . N]) of the IIR filter 308 of the illustrated example is the set of fractional-pixel interpolated values 212 (e.g., the destination signal). In the illustrated example, the fractional-pixel interpolated values 212 are half-pixel values. However, techniques disclosed herein may be used to generate interpolated values based on other fractional pixel sizes.

While an example manner of implementing the upsampler 204 of FIG. 2 is illustrated in FIG. 3, one or more of the elements, processes and/or devices illustrated in FIG. 3 may be combined, divided, re-arranged, omitted, eliminated and/or implemented in any other way. Further, the example FIR filter 302, the example IIR filtering initializer 306, the example IIR filter 308 and/or, more generally, the example upsampler 204 of FIG. 3 may be implemented by hardware, software, firmware and/or any combination of hardware, software and/or firmware. Thus, for example, any of the example FIR filter 302, the example IIR filtering initializer 306, the example IIR filter 308 and/or, more generally, the example upsampler 204 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example FIR filter 302, the example IIR filtering initializer 306, and/or the example IIR filter 308 are hereby expressly defined to include a tangible computer readable storage device or storage disc such as a memory, a digital versatile disk (DVD), a compact disk (CD), a Blu-ray disk, etc. storing the software and/or firmware. Further still, the example upsampler 204 of FIG. 3 may include one or more elements, processes and/or devices in addition to, or instead of, those illustrated in FIG. 3, and/or may include more than one of any or all of the illustrated elements, processes and devices.

Examples disclosed herein improve the precision of interpolation filtering over prior techniques that use an IIR/FIR cascade by applying an FIR filter first and performing IIR filtering second and by using an extended bit-depth based on the boundary condition initializations described above. By applying an FIR filter using integer coefficients, such as the 4-tap FIR filter with coefficient values of [1, 8, 8, 1] and/or the 2-tap FIR filter with coefficient values of [25, 25], the bit-depth of a signal is increased and round-off errors after the subsequent applications of the IIR filter are substantially decreased. For example, when applying subsequent IIR filter for a source signal (e.g., the source signal samples 208 of FIG. 1) having an extended bit depth, non-controlled round-off errors are relatively lower than the round-off errors generated using prior IIR/FIR cascade techniques.

Advantages of examples disclosed herein are mathematically evident by the fact that doubly infinite Toeplitz matrices, in which IIR and FIR filters may be presented, are commuting and by the fact that an FIR filter implemented with integer coefficients provides an output signal with increased bit depth. Thus, assuming that filters are applied to long enough data, an FIR filter and a subsequent IIR filter of the FIR/IIR cascade techniques disclosed herein may be performed with the same multipliers as in prior IIR/FIR cascade techniques without causing the artificial bit-depth increases in intermediate computations that occur in prior IIR/FIR filtering techniques. Example FIR/IIR cascade techniques disclosed herein substantially decrease or eliminate such artificial bit-depth increases in intermediate computations. Although examples disclosed herein involve the use of 4-tap and 2-tap FIR filters, examples disclosed herein may be used in connection with FIR filters having any other number of taps and with any suitable IIR filter implemented using fixed-point arithmetic.

Figure 4:
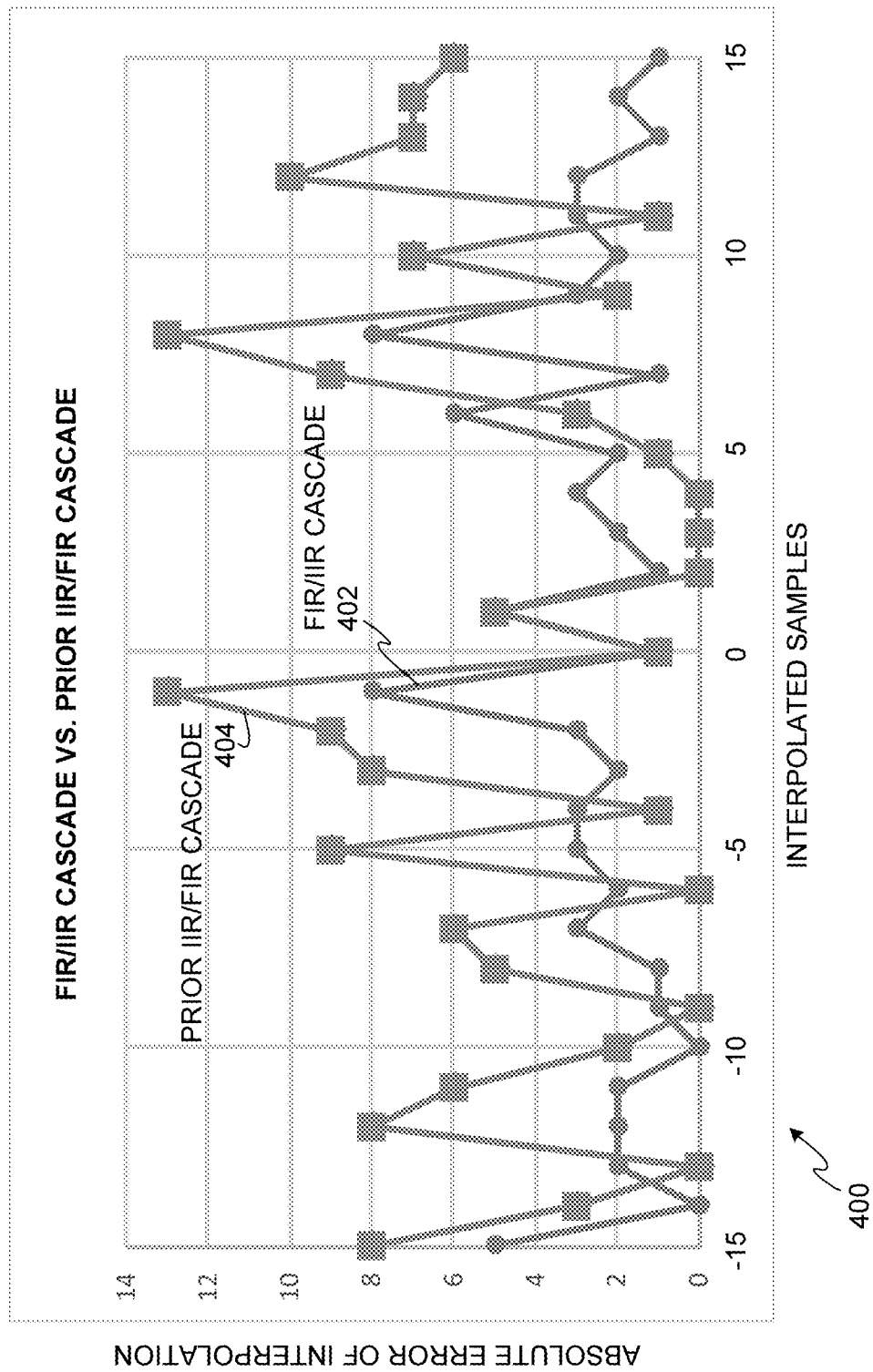
FIG. 4 is a graph showing a comparison of example media processing performances between examples disclosed herein and prior techniques.

FIG. 4 is a graph 400 showing a comparison of example media processing performances between FIR/IIR cascade examples disclosed herein (e.g., FIR/IIR cascade 402) and prior IIR/FIR cascade techniques (e.g., prior IIR/FIR cascade 404). The example performance comparison shown in the graph 400 is based on a sampled Runge function, which is a conventional test for assessing the performance of interpolation techniques. In the illustrated example, the graph 400 shows the absolute error of interpolation by the prior IIR/FIR cascade 404 (implemented with an extra 2-bit bit-depth increase) and a disclosed FIR/IIR cascade with the same multipliers for the IIR and FIR parts in fixed-point arithmetic. The region of performance shown in the graph 400 is sufficiently far enough from the boundaries of the test function so that the graph 400 can show an emphasized view on the effects of round-off errors rather than the errors associated with inexact boundary settings for IIR filtering. If round-off errors were eliminated, the FIR/IIR cascade 402 and the prior IIR/FIR cascade 404 would give the same values and points on the graph 400 and, thus, would overlap or coincide with one another. However, the effects of the higher round-off errors resulting from the prior IIR/FIR cascade 404 creates a measureable performance difference between the FIR/IIR cascade 402 using examples disclosed herein and the prior IIR/FIR cascade 404 because the round-off errors of the FIR/IIR cascade 402 is relatively less than the round-off error of the prior IIR/FIR cascade 404.

Figure 5:
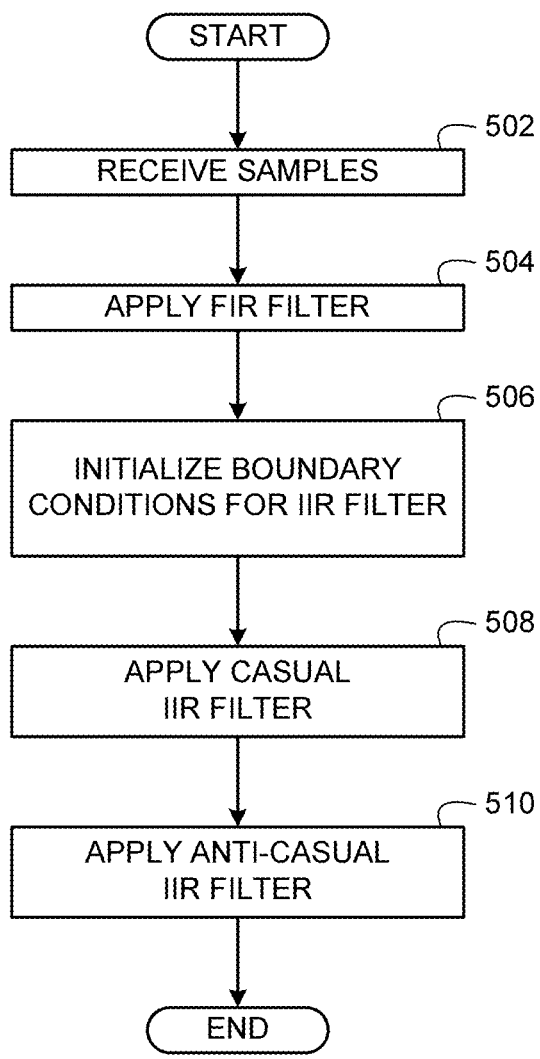
FIG. 5 is a flowchart representative of example machine readable instructions that may be executed to implement the example upsampler of FIGS. 2 and 3 to apply a FIR filter first, followed by a causal infinite impulse response (IIR) filter and then an anti-causal IIR filter.
Figure 6:
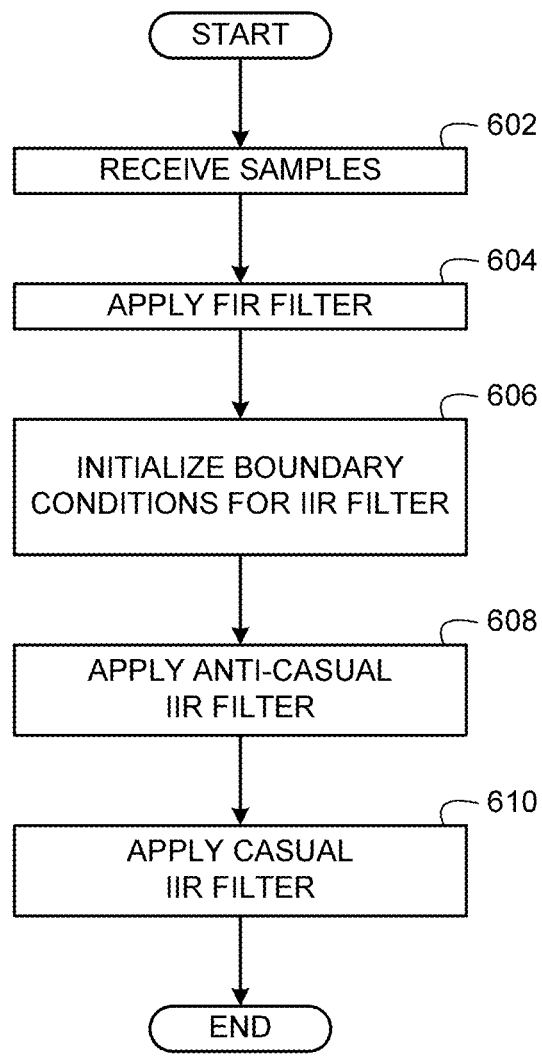
FIG. 6 is a flowchart representative of example machine readable instructions that may be executed to implement the example upsampler of FIGS. 2 and 3 to apply a FIR filter first, followed by an anti-causal IIR filter and then a causal IIR filter.

FIG. 5 is a flowchart representative of example machine readable instructions that may be executed to implement the example upsampler 204 of FIGS. 2 and 3 to apply a FIR filter first followed by a causal infinite impulse response (IIR) filter and then an anti-causal IIR filter. FIG. 6 is a flowchart representative of example machine readable instructions that may be executed to implement the example upsampler of FIGS. 3 and 2 to apply a FIR filter first followed by an anti-causal IIR filter and then a causal IIR filter. In these examples, the machine readable instructions comprise programs for execution by a processor such as the processor 712 shown in the example processor platform 700 discussed below in connection with FIG. 7. The programs may be embodied in software stored on a tangible computer readable storage medium such as a CD-ROM, a floppy disk, a hard drive, a DVD, a Blu-ray disk, or a memory associated with the processor 712, but the entirety of the programs and/or parts thereof could alternatively be executed by a device other than the processor 712 and/or embodied in firmware or dedicated hardware. Further, although the example programs are described with reference to the flowcharts illustrated in FIGS. 5 and 6, many other methods of implementing the example upsampler 204 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The example program of FIG. 5 involves applying a FIR filter followed by an IIR filtering process. The IIR filtering process of FIG. 5 involves first applying a causal IIR filter and applying an anti-causal IIR filter second. The example program of FIG. 5 begins at block 502 at which the upsampler 204 (FIGS. 2 and 3) receives the motion-supplemented source signal samples 210. The FIR filter 302 (FIG. 3) applies a FIR filter (block 504). For example, the FIR filter 302 may apply a 4-tap FIR filter with coefficient values of [1, 8, 8, 1] using example Function 1 above. Alternatively, the FIR filter 302 may apply a 2-tap FIR filter with coefficient values of [25, 25] using example Function 2 above.

The IIR filtering initializer 306 (FIG. 3) initializes boundary conditions for a subsequent IIR filter (block 506). For example, when the 4-tap FIR filter is applied at block 504, the IIR filtering initializer 306 can use example Function 3 above to initialize boundary conditions for the causal IIR filter at block 506 and can use example Function 4 above to initialize boundary conditions for the anti-causal IIR filter also at block 506. When the 2-tap FIR filter is applied at block 504, the IIR filtering initializer 306 can initialize reflecting boundary conditions or non-reflecting boundary conditions as described above in connection with FIG. 3. For example, at block 506 the IIR filtering initializer 306 can use example Function 7 above to initialize reflecting boundary conditions for the causal IIR filter and can use example Function 8 above to initialize reflecting boundary conditions for the anti-causal IIR filter. Alternatively, at block 506 the IIR filtering initializer 306 can use example Function 9 above to initialize non-reflecting boundary conditions for the causal IIR filter and can use example Function 10 above to initialize non-reflecting boundary conditions for the anti-causal IIR filter.

In some examples, the IIR filtering initializer 306 may initialize boundary conditions for the subsequent IIR filter at any time before the IIR filter is applied. Thus, the initialization operation of block 506 of the illustrated example may be performed at any time prior to applying the IIR filter at blocks 508 and 510. For example, the initialization operation of block 506 of the illustrated example may be performed before the FIR filter is applied at block 504.

The example IIR filter 308 (FIG. 3) applies a causal IIR filter (block 508). For example, when the 4-tap filter is applied at block 504, the example IIR filter 308 uses example Function 15 above in connection with the boundary conditions generated at block 506 to apply the causal IIR filter to the values generated at block 504 by the FIR filter 302. Alternatively, when the 2-tap filter is applied at block 504, the example IIR filter 308 uses example Function 19 above in connection with boundary conditions generated at block 506 to apply the causal IIR filter to the values generated at block 504 by the FIR filter 302.

After first applying the causal IIR filter at block 508, the example IIR filter 308 subsequently applies the anti-causal IIR filter at block 510. For example, when the 4-tap filter is applied at block 504, the example IIR filter 308 uses example Function 16 above in connection with the boundary conditions generated at block 506 to apply the anti-causal IIR filter to the values generated at block 504 by the FIR filter 302. Alternatively, when the 2-tap filter is applied at block 504, the example IIR filter 308 uses example Function 20 above in connection with boundary conditions generated at block 506 to apply the anti-causal IIR filter to the values generated at block 504 by the FIR filter 302. In the illustrated example of FIG. 5, the anti-causal IIR filter of block 510 generates the fractional-pixel interpolated values 212 of FIGS. 2 and 3. In some examples, a processor (e.g., the processor 712) may store the fractional-pixel interpolated values 212 in an encoded video data structure (e.g., in one or more of the memories 714, 716, 713, and/or 728) during a video encoding process and/or uses the fractional-pixel interpolated values 212 as a prediction signal or prediction data in a prediction process of a hybrid video encoder. Alternatively, the processor may output the fractional-pixel interpolated values 212 to a display interface for displaying decoded video during a video decoding process. The example process of FIG. 5 then ends.

The example program of FIG. 6 involves applying a FIR filter followed by an IIR filtering process. The IIR filtering process of FIG. 6 involves first applying an anti-causal IIR filter and applying a causal IIR filter second. The example program of FIG. 6 begins at block 602 at which the upsampler 204 (FIGS. 2 and 3) receives the motion-supplemented source signal samples 210. The FIR filter 302 (FIG. 3) applies a FIR filter (block 604). For example, the FIR filter 302 may apply a 4-tap FIR filter with coefficient values of [1, 8, 8, 1] using example Function 1 above. Alternatively, the FIR filter 302 may apply a 2-tap FIR filter with coefficient values of [25, 25] using example Function 2 above.

The IIR filtering initializer 306 (FIG. 3) initializes boundary conditions for a subsequent IIR filter (block 606). For example, when the 4-tap FIR filter is applied at block 604, the IIR filtering initializer 306 can use example Function 5 above to initialize boundary conditions for the causal IIR filter at block 606 and can use example Function 6 above to initialize boundary conditions for the anti-causal IIR filter also at block 606. When the 2-tap FIR filter is applied at block 604, the IIR filtering initializer 306 can initialize reflecting boundary conditions or non-reflecting boundary conditions as described above in connection with FIG. 3. For example, at block 606 the IIR filtering initializer 306 can use example Function 11 above to initialize reflecting boundary conditions for the causal IIR filter and can use example Function 12 above to initialize reflecting boundary conditions for the anti-causal IIR filter. Alternatively, at block 606 the IIR filtering initializer 306 can use example Function 13 above to initialize non-reflecting boundary conditions for the causal IIR filter and can use example Function 14 above to initialize non-reflecting boundary conditions for the anti-causal IIR filter.

In some examples, the IIR filtering initializer 306 may initialize boundary conditions for the subsequent IIR filter at any time before applying the IIR filter. Thus, the initialization operation of block 606 of the illustrated example may be performed at any time prior to applying the IIR filter at blocks 608 and 610. For example, the initialization operation of block 606 of the illustrated example may be performed before the FIR filter is applied at block 604.

The example IIR filter 308 (FIG. 3) applies an anti-causal IIR filter (block 608). For example, when the 4-tap filter is applied at block 604, the example IIR filter 308 uses example Function 17 above in connection with boundary conditions generated at block 606 to apply the anti-causal IIR filter to the values generated at block 604 by the FIR filter 302. Alternatively, when the 2-tap filter is applied at block 604, the example IIR filter 308 uses example Function 21 above in connection with boundary conditions generated at block 606 to apply the anti-causal IIR filter to the values generated at block 604 by the FIR filter 302.

After first applying the anti-causal IIR filter at block 608, the example IIR filter 308 subsequently applies the causal IIR filter at block 610. For example, when the 4-tap filter is applied at block 604, the example IIR filter 308 uses example Function 18 above in connection with boundary conditions generated at block 606 to apply the causal IIR filter to the values generated at block 604 by the FIR filter 302. Alternatively, when the 2-tap filter is applied at block 604, the example IIR filter 308 uses example Function 22 above in connection with boundary conditions generated at block 606 to apply the causal IIR filter to the values generated at block 604 by the FIR filter 302. In the illustrated example of FIG. 6, the causal IIR filter of block 610 generates the fractional-pixel interpolated values 212 of FIGS. 2 and 3. In some examples, a processor (e.g., the processor 712) may store the fractional-pixel interpolated values 212 in an encoded video data structure (e.g., in one or more of the memories 714, 716, 713, and/or 728) during a video encoding process and/or uses the fractional-pixel interpolated values 212 as a prediction signal or prediction data in a prediction process of a hybrid video encoder. Alternatively, the processor may output the fractional-pixel interpolated values 212 to a display interface for displaying decoded video during a video decoding process. The example process of FIG. 6 then ends.

Figure 7:
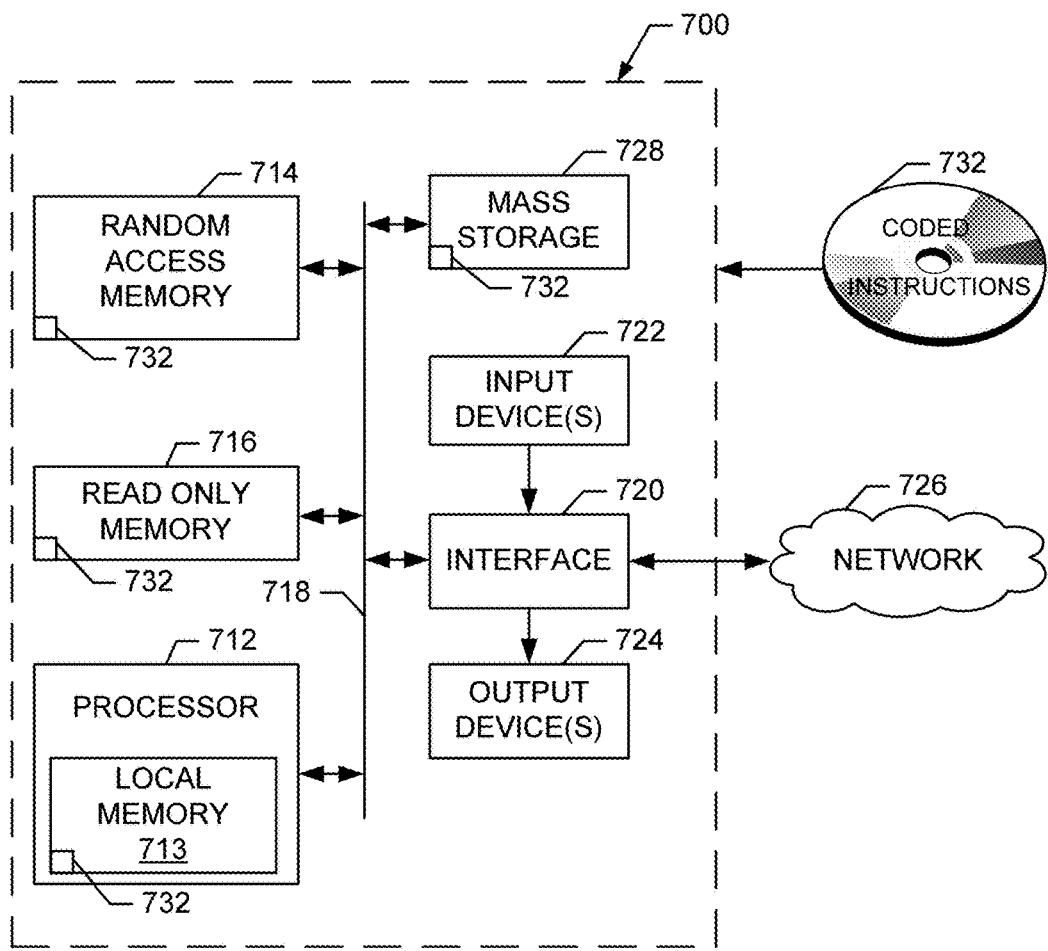
FIG. 7 is a block diagram of an example processor system that may execute the instructions of FIGS. 4 and/or 5 to implement the upsampler of FIG. 3 and/or the apparatus of FIG. 2.

FIG. 7 is a block diagram of an example processor platform 700 capable of executing the instructions of FIGS. 5 and 6 to implement the upsampler 205 of FIGS. 2 and 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card.

The interface circuit 720 of the illustrated example also includes a communication device such as a transmitter, a receiver, a transceiver, a modem and/or network interface card to facilitate exchange of data with external machines (e.g., computing devices of any kind) via a network 726

(e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The example machine readable instructions of FIGS. 5 and 6 may be stored as coded instructions 732 in the mass storage device 728, in the volatile memory 714, in the non-volatile memory 716, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
applying a finite impulse response (FIR) filter to samples of a source signal to generate an array of values;
after applying the FIR filter, applying an infinite impulse response (IIR) filter to the array of the values to generate fractional-pixel interpolated values; and
at least one of storing the fractional-pixel interpolated values in an encoded video data structure, outputting the fractional-pixel interpolated values to a display interface, or using the fractional-pixel interpolated values as prediction data to encode a future frame.

2. A method as defined in claim 1, wherein applying the IIR filter includes:
applying a causal IIR filter to the array of values to generate a second array of second values; and
after applying the causal IIR filter, applying an anti-causal IIR filter to the second array of the second values to generate the fractional-pixel interpolated values.

3. A method as defined in claim 2, further including initializing the IIR filter by:
applying a weighted sum of four of the source signal samples with weights [34, 51, 13, −2] to boundary conditions for the causal IIR filter pass with a pole value of −½; and
applying a weighted sum of four of the source signal samples with weights [36, 52, 12, −1] to boundary conditions for the anti-causal IIR filter pass with a pole value of −½.

4. A method as defined in claim 2, further including initializing the IIR filter by:
applying a weighted sum of two of the source signal samples with weights [19, 20] to boundary conditions for the causal IIR filter pass with a pole value of −¼; and
applying a weighted sum of two of the source signal samples with weights [20, 19] to boundary conditions for the anti-causal IIR filter pass with a pole value of −¼.

5. A method as defined in claim 2, further including initializing the IIR filter by:
applying a weighted sum of three of the source signal samples with weights [11, 30, −1] to boundary conditions for the causal IIR filter pass with a pole value of −¼; and
applying a weighted sum of three of the source signal samples with weights [−1, 30, 11] to boundary conditions for the anti-causal IIR filter pass with a pole value of −¼.

6. A method as defined in claim 1, wherein applying the IIR filter includes:
applying an anti-causal IIR filter to the array of values to generate a second array of second values; and
after applying the anti-causal IIR filter, applying a causal IIR filter to the second array of the second values to generate the fractional-pixel interpolated values.

7. A method as defined in claim 6, further including initializing the IIR filter by:
applying a weighted sum of four of the source signal samples with weights [44, 58, 11, −1] to boundary conditions for the anti-causal IIR filter pass with a pole value of −½; and
applying a weighted sum of four of the source signal samples with weights [−2, 13, 51, 34] to boundary conditions for the causal IIR filter pass with a pole value of −½.

8. A method as defined in claim 6, further including initializing the IIR filter by:
applying a weighted sum of two of the source signal samples with weights [20, 22] to boundary conditions for the anti-causal IIR filter pass with a pole value of −¼; and
applying a weighted sum of two of the source signal samples with weights [21, 19] to boundary conditions for the causal IIR filter pass with a pole value of −¼.

9. A method as defined in claim 6, further including initializing the IIR filter by:
applying a weighted sum of three of the source signal samples with weights [11, 30, −1] to boundary conditions for the anti-causal IIR filter pass with a pole value of −¼; and
applying a weighted sum of three of the source signal samples with weights [−1, 30, 11] to boundary conditions for the causal IIR filter pass with a pole value of −¼.

10. A method as defined in claim 1, wherein applying the FIR filter to the samples of the source signal includes applying a 4-tap FIR filter with coefficient values [1, 8, 8, 1], and wherein applying the IIR filter includes applying an IIR filter with a pole value of −½.

11. A method as defined in claim 1, wherein applying the FIR filter to the samples of the source signal includes applying a 2-tap FIR filter with coefficient values [25, 25], and wherein applying the IIR filter includes applying an IIR filter with a pole value of −¼.

12. A method as defined in claim 1, wherein the fractional-pixel interpolated values are half-pixel interpolated values.

13. A method as defined in claim 1, wherein applying the FIR filter and the IIR filter includes applying the FIR filter and the IIR filter in a H.264/advanced video coding encoder using a half-pixel filter to perform upsampling of a video.

14. A method as defined in claim 1, wherein the IIR filter is implemented with a rational pole (p), (p) being equal to (−K)/L, and K and L being signed integer numbers.

15. A method as defined in claim 14, wherein the FIR filter is applied using integer arithmetic, and a sum of coefficients of the FIR filter is a multiple of (K+L).

16. A method as defined in claim 1, wherein applying the FIR filter to the samples of the source signal includes applying the FIR filter with coefficient values that are powers of two.

17. An apparatus, comprising:
- a finite impulse response (FIR) filter to process samples of a source signal to generate an array of values;
- an infinite impulse response (IIR) filter to, after applying the FIR filter, process the array of the values to generate fractional-pixel interpolated values; and
- a processor to at least one of store the fractional-pixel interpolated values in an encoded video data structure or output the fractional-pixel interpolated values to a display interface.

18. An apparatus as defined in claim 17, wherein the IIR filter is to process each value of the array by:
- applying a causal IIR filter to the array of values to generate a second array of second values; and
- after applying the causal IIR filter, applying an anti-causal IIR filter to the second array of the second values to generate the fractional-pixel interpolated values.

19. An apparatus as defined in claim 17, wherein the IIR filter is to process each of the values of the array by:
- applying an anti-causal IIR filter to the array of values to generate a second array of second values; and
- after applying the anti-causal IIR filter, applying a causal IIR filter to the second array of the second values to generate the fractional-pixel interpolated values.

20. An apparatus as defined in claim 17, wherein the FIR filter is to process the samples of the source signal by applying a 4-tap FIR filter with coefficient values [1, 8, 8, 1], and wherein the IIR filter is an IIR filter with a pole value of $-\frac{1}{2}$.

21. An apparatus as defined in claim 17, wherein the FIR filter is to process the samples of the source signal by applying a 2-tap FIR filter with coefficient values [25, 25], and wherein the IIR filter is an IIR filter with a pole value of $-\frac{1}{4}$.

22. An apparatus as defined in claim 17, wherein the FIR filter and the IIR filter are to operate in a H.264/advanced video coding encoder using a half-pixel filter to perform upsampling of a video.

23. An apparatus as defined in claim 17, wherein the IIR filter is implemented with a rational pole (p), (p) being equal to (−K)/L, and K and L being signed integer numbers, wherein the FIR filter is applied using integer arithmetic, and a sum of coefficients of the FIR filter is a multiple of (K+L).

24. An apparatus as defined in claim 17, wherein the FIR filter is to be applied with coefficient values that are powers of two.

25. A tangible computer readable storage medium comprising instructions that, when executed, cause a machine to at least:
- apply a finite impulse response (FIR) filter to samples of a source signal to generate an array of values;
- after applying the FIR filter, apply an infinite impulse response (IIR) filter to the array of values to generate fractional-pixel interpolated values; and
- at least one of store the fractional-pixel interpolated values in an encoded video data structure or output the fractional-pixel interpolated values to a display interface.

* * * * *